United States Patent

Fiderer

[15] 3,692,237

[45] Sept. 19, 1972

[54] PROCESS FOR DIGITIZING ELECTRIC CIRCUIT PATTERNS

[72] Inventor: Leo Fiderer, 5640 Aldea Ave., Encino, Calif. 91316

[22] Filed: Aug. 3, 1970

[21] Appl. No.: 60,557

[52] U.S. Cl. ..................234/2, 234/89, 235/61.11 E, 250/219 R

[51] Int. Cl. ..............................................G06k 1/00

[58] Field of Search ....................408/3; 234/2, 3, 89; 250/219 QA, 219 D, 219 R; 178/18, 19; 235/61.11 E

[56] References Cited

UNITED STATES PATENTS

| | | | |
|---|---|---|---|
| 3,532,893 | 10/1970 | Marantette et al. | ........408/3 X |
| 696,708 | 4/1902 | Botton | ...............250/219 D X |
| 2,820,907 | 1/1958 | Silverman | ..........250/219 D X |
| 2,803,178 | 8/1957 | Lotz | ................235/61.11 E X |
| 3,335,283 | 8/1967 | Gingras et al. | ......250/219 D X |
| 3,172,598 | 3/1965 | Carson et al. | ............234/89 X |
| 3,293,442 | 12/1966 | Marantette et al. | .......408/3 X |
| 3,163,057 | 12/1964 | Drummond et al. | ........408/3 X |

*Primary Examiner*—James M. Meister
*Attorney*—Jessup and Beecher

[57] ABSTRACT

An improved process is provided for digitizing electric circuit patterns and for transferring such patterns into binary control data for subsequent use in automatic machinery in the fabrication of printed circuit boards and the like. In the practice of the process of the invention, a particular pattern is layed out on a transparent or translucent sheet or strip which has X-axis and Y-axis grid lines thereon. The grid sheet or strip is then passed over a read station at which photocells are used in conjunction with light sources to detect the presence or absence of a circuit line on each of a multiplicity of X- or Y-axis segments of the grid lines. The photocells generate binary digital signals which may be stored on/any appropriate medium, such as a punched paper tape, or other media, for the subsequent control of automatic machinery in the fabrication of printed circuit boards and the like.

10 Claims, 11 Drawing Figures

INVENTOR:
Leo Fiderer
Jemp and Beecher
By Keith D. Beecher
ATTORNEYS

INVENTOR
Leo Fiderer
Jessup and Beecher
By Keith D. Beecher
ATTORNEYS

INVENTOR
Leo Fiderer
Jessup and Beecher
By Keith D. Beecher
ATTORNEYS

PROCESS FOR DIGITIZING ELECTRIC CIRCUIT PATTERNS

BACKGROUND OF THE INVENTION

The prior art methods of translating gridded lay-out patterns of circuits into numerical control information use a device known as a "Digitizer." The aforesaid digitizer consists of a large table fitted with a movable carriage and a reading head. To operate the digitizer, a gridded sketch of the circuit pattern is first fastened to the table in accordance with the prior art practice. An operator then manually moves the reading head over the lines on the sketch, tracing the path of such lines The operator actuates a switch at the termination point of each line segment on the sketch, and at each pad or hole in the circuit layout. The position of the reading head at each switch actuation point is monitored by an electro-mechanical encoding system and its associated circuitry. The position information derived from the prior art system is then coded and stored, either on a set of punched cards, on a magnetic tape, or on a punched paper tape, for subsequent input to a computer. The computer then creates the necessary control signals for automatic drafting machines, photoplotters, or similar automatic devices for creating photomasters for printed circuits.

The prior art digitizing systems, such as described in the preceding paragraph, are extremely complex and expensive. Such systems may be used only in conjunction with other expensive equipment, such as a computer, card punches, and other peripheral computer equipment. Moreover, the prior art systems are relatively slow since they require between an hour and an hour and a half for a skilled operator to digitize a typical printed circuit. In addition, a verification system is required to check whether or not the operator has properly performed his task, or whether he has inadvertently omitted a line or a pad from the digitized sequence.

The digitizing process of the present invention is advantageous in that it requires simpler and less expensive equipment than the prior art system described above, and in that a circuit pattern may be digitized quicker than was the case with the prior art system, and without the need for any particular manual skills or dexterity. Moreover, the method of the present invention is capable of directly creating control tapes, and the like, for controlling the operation of the above-mentioned automatic machinery, and without the need for an intervening computer or any peripheral or ancillary equipment.

DETAILED DESCRIPTION OF THE ILLUSTRATED EMBODIMENT

In the practice of the process of the present invention, and as was the case in the prior art method described above, the interconnection pattern of the desired circuit is first layed out by freehand on a sheet of translucent material, on which an appropriate grid of X-axis and Y-axis lines has been imprinted. The sheet material, for example, may be made of vellum, mylar, or any other appropriate transparent or translucent material, such as is normally used in drafting offices.

Figures 1, 2A, 3:
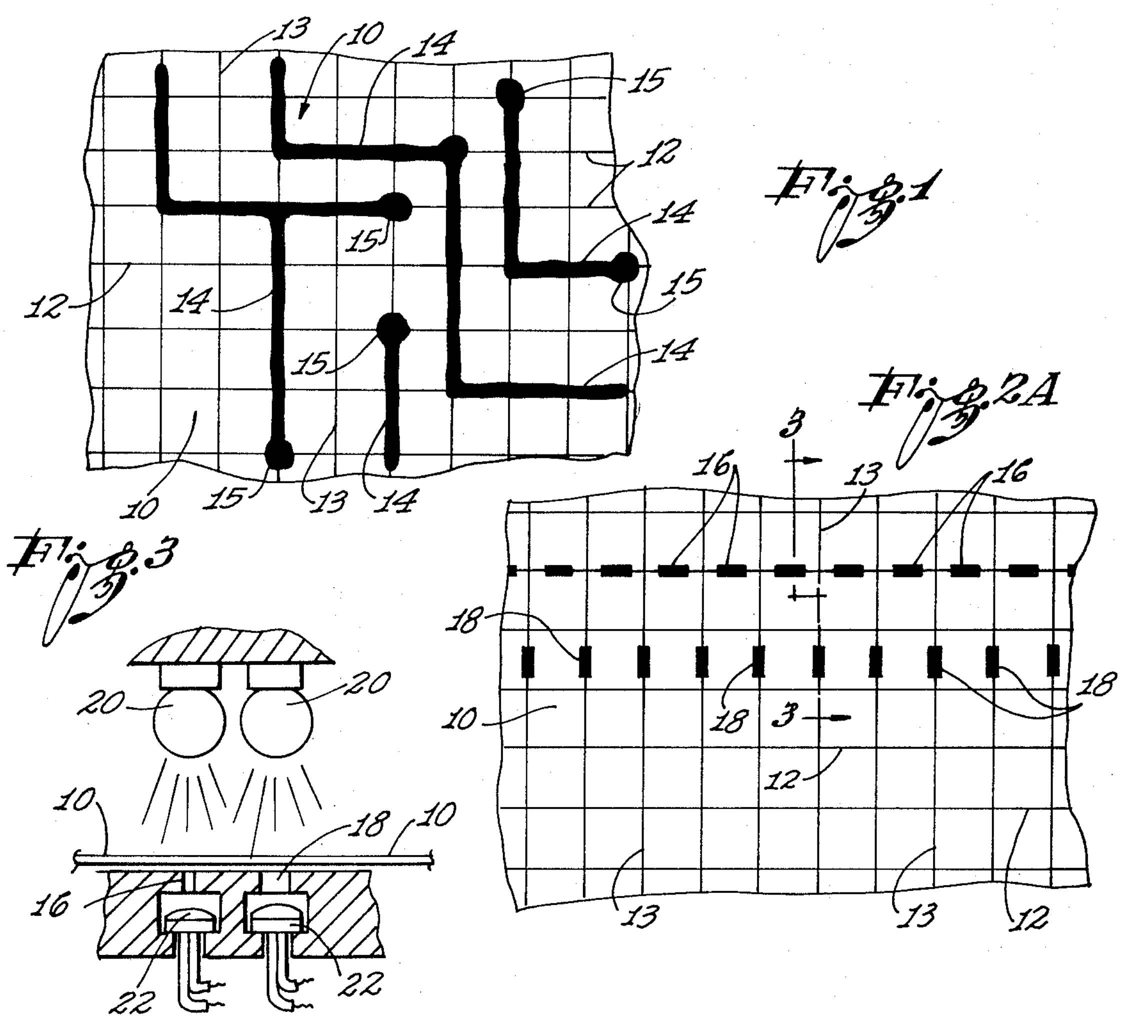
FIG. 1 is a fragment of a translucent sheet having usual grid lines thereon, and with a particular circuit pattern being drawn on certain X-axis and Y-axis segments of the grid lines.
FIG. 2A is a representation of a blank translucent grid sheet as it is drawn across a read station, and showing the position of certain sensing orifices at the read station with respect to the grid line segments.
FIG. 3 is a section through the aforesaid read station taken along the line 3—3, and showing the sensing orifices in conjunction with corresponding light sources and photocells.

The aforesaid gridded sheet is designated 10 in FIG. 1, and it has faintly printed grid lines 12 which are designated herein as X-axis grid lines 12 and Y-axis grid lines 13, and which intersect one another to form a plurality of squares on the material. The grid lines are usually, but not necessarily spaced 0.100 inches apart, and they serve as guide lines for the hand sketched circuit pattern designated 14. The circuit pattern 14 follows the X-axis grid lines 12 and Y-axis grid lines 13, and it may be drawn, for example, with a dark soft pencil or a dark felt pen, so as to provide maximum possible contrast between the light transmitted through the sheet 10 in the unmarked areas, and the parts of the sheet 10 covered by the lines 14.

Figure 2B:
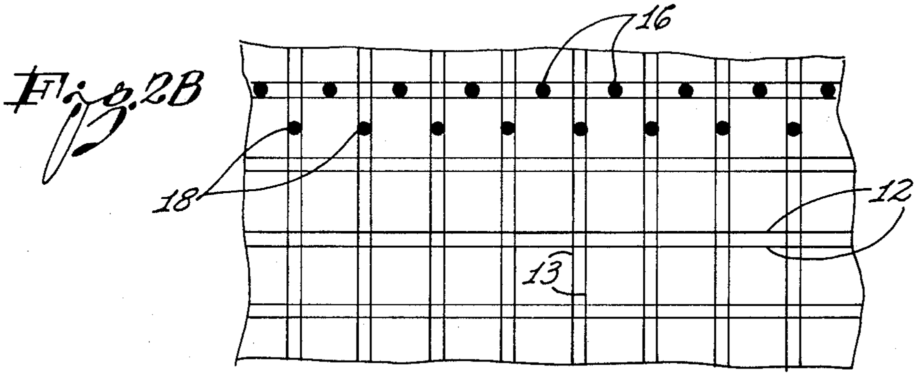
FIG. 2B is an alternate representation of a blank translucent grid sheet with alternately shaped sensing orifices.

A blank/portion of the gridded sheet 10 is shown in FIG. 2A as the sheet is drawn across sensing orifices 16 and 18. The registry of the sheet 10 with the sensing orifices 16 and 18 is such that as the sheet is drawn passed the reading station, the orifices 16 become aligned with successive segments of the X-axis grid lines, and the orifices 18 become aligned with successive segments of the Y-axis grid lines 13. FIG. 2B shows an alternate form of a blank gridded sheet, where two faint guide lines close to each other define the paths of possible line segments. The hand sketched pencil or pen markings representing the circuit pattern 14 are placed in the narrow spaces between the pairs of grid lines 12 and 13. It will be appreciated that for each subsequent position of the sheet 10 as it is drawn across the reading station, light is passed through the sheet to a corresponding one of the orifices 16 and 18, depending upon whether or not an opaque line of the circuit pattern 14 has been sketched across that particular segment, as shown in FIG. 1.

The shape of the sensing orifices 16 and 18 does not necessarily have to be rectangular. However, for maximum effectiveness as light gating devices, it is desirable that the maximum width of the sensing orifices 16 and 18 be not greater than the width of the sketched markings representing the circuit pattern 14.

The sheet 10 is preferably drawn intermittently passed the reading station so that it moves incrementally from one X-axis grid line 12 to the next. It will be understood that for each incremental position of the sheet 10, corresponding binary digital signals are developed having binary values representative of whether or not a line of the circuit pattern 14 appeared or did not appear over the corresponding segments of the X-axis and Y-axis grid lines 12 and 13.

In the somewhat schematic representation of FIG. 3, the gridded sheet 10 is shown as being drawn across the reading station so as to permit light from light sources 20 to pass through orifices, such as the orifices 16 and 18, to appropriate photocells 22. A separate photocell is provided for each of the orifices 16 and 18, so that a separate binary digital signal is produced for each incremental position of the sheet 16 corresponding to whether or not the corresponding segments of the X-axis grid lines 12 and the corresponding segments of the Y-axis grid lines 13 are covered by a line of the circuit pattern 14.

The sheet 10, for example, is inserted into a drive mechanism which advances the sheet in steps corresponding to the grid line spacing of the grid line perpendicular to the direction of travel, here assumed to be the X-axis grid lines. As the sheet 10 advances in steps, it is pulled past the read station which, as described above, passes one or more light sources 20 above the sheet, and an array of sensing orifices, such as the orifices 16 and 18 beneath the sheet, each sensing orifice transmitting light through its corresponding photocell 22. At each step, one set of sensing orifices 18 is positioned underneath grid line segments of the Y-axis grid lines 13, and another set of sensing orifices 16 is positioned underneath the grid line segments of the X-axis grid lines 12.

As the sheet 10 with the sketched layout of the circuit pattern 14 is moved past the sensing orifices 16 and 18, light passes through the sheet from the light sources 20 to the photocells 22, except when the opaque lines of the sketched layout of the circuit pattern 14 cover a particular sensing orifice and block the light which would normally pass through that orifice to the corresponding photocell 22.

The photocells 22 are connected to appropriate amplifiers which are constructed to produce different output voltage levels, depending on whether an opaque line of the circuit pattern 14 covers the corresponding sensing orifice, or not. The two output voltage levels from the amplifier represent a digital data binary "0" condition or a binary "1" condition for subsequent processing. Therefore, as the sheet 10 is advanced past the read station from one end to the other, the absence or presence of a marked opaque X-axis grid line 12 or Y-axis grid line 13 is detected for each grid line segment between two grid line intersections, and the resulting digital data may be recorded for subsequent use with the variety of automatic machines for the creation of printed circuit boards, and the like.

It is evident that the concept of the present invention does not necessarily require that the arrays of sensing orifices 16 and 18, extend over the entire width of the sheet 10 on which the circuit pattern 14 has been sketched. For example, the arrays of sensing orifices 16 and 18, and corresponding photocells 22, may cover only a portion of the width of the sheet 10. Then, the digitizing operation requires that the sheet 10 be moved across the reading station in two or more passes. At the end of each pass, the sheet 10 may then be shifted sideways by an amount equal to the width of the read station and the next pass initiated.

Figure 4:
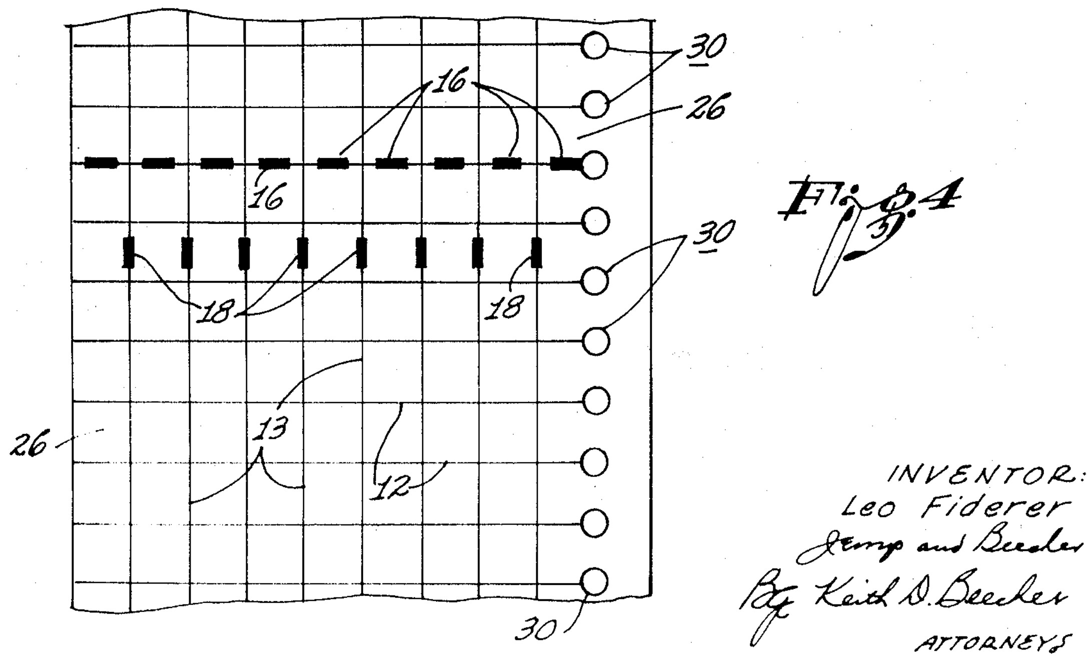
FIG. 4 is a representation like FIG. 2, but showing how the grid sheet of FIG. 2 may be formed into strips which are drawn in succession past the aforesaid read station, the illustrated strip including socket holes for indexing purposes.

An alternate procedure to the aforesaid lateral shift of the sheet 10 for successive passes, is to separate the sheet itself into strips, such as the strip 26 of FIG. 4. The width of each strip 26 in that case is made equal to the width of the read station until all the information represented by the layout sketch of the circuit pattern 14 on the original sheet has been sensed.

Whether the digitizing operation in accordance with the process of the present invention can be completed in a single pass or in multiple passes, it is obvious that the process of the invention is capable of digitizing the entire circuit pattern 14 more rapidly than the prior art method described above, in which a conventional digitizing table is used, and an operator manually positions a movable reading head over every critical point on the circuit pattern.

Suitable mechanisms required to advance the sheet 10 or the strips 26 incrementally across the read station, in the practice of the present invention, are well known per se to the art. Such mechanisms may be similar to those used, for example, to move motion picture films through projection gates, or perforated numerical control tapes past reading stations. Since the details of the drive mechanisms themselves form no part of the present invention, and since such mechanisms are well known to the art, it is considered unnecessary that they be described in detail in the present specification.

The strip 26 of FIG. 4 is provided with indexing sprocket holes 30 which, as in the case of motion picture film, assure that each step of the drive mechanism will cause the proper X-axis grid line segments 12 and Y-axis grid line segments 13 to be aligned with the corresponding orifices 16 and 18. These sprocket holes 30 are punched into the strip in increments corresponding to the X-axis grid lines 12, as shown in FIG. 4. Alternately, pre-printed opaque marks 32, such as shown in FIG. 5, may be used, and similarly located.

The strip 26 FIG. 4 is controlled in a manner such that the strip moves at each incremental step from one indexing hole 30 to the next. At each such step, an electric pulse is generated for synchronizing purposes, and the resulting pulses are the usual clock pulses used in the electronic logic circuit associated with the electrical outputs from the photocell 22. The resulting binary digital signals for each incremental position of the strip may be recorded on a punched paper tape, or other appropriate medium, or may be used directly to actuate an automatic machine in the printed circuit fabrication.

Figures 5, 6, 7:
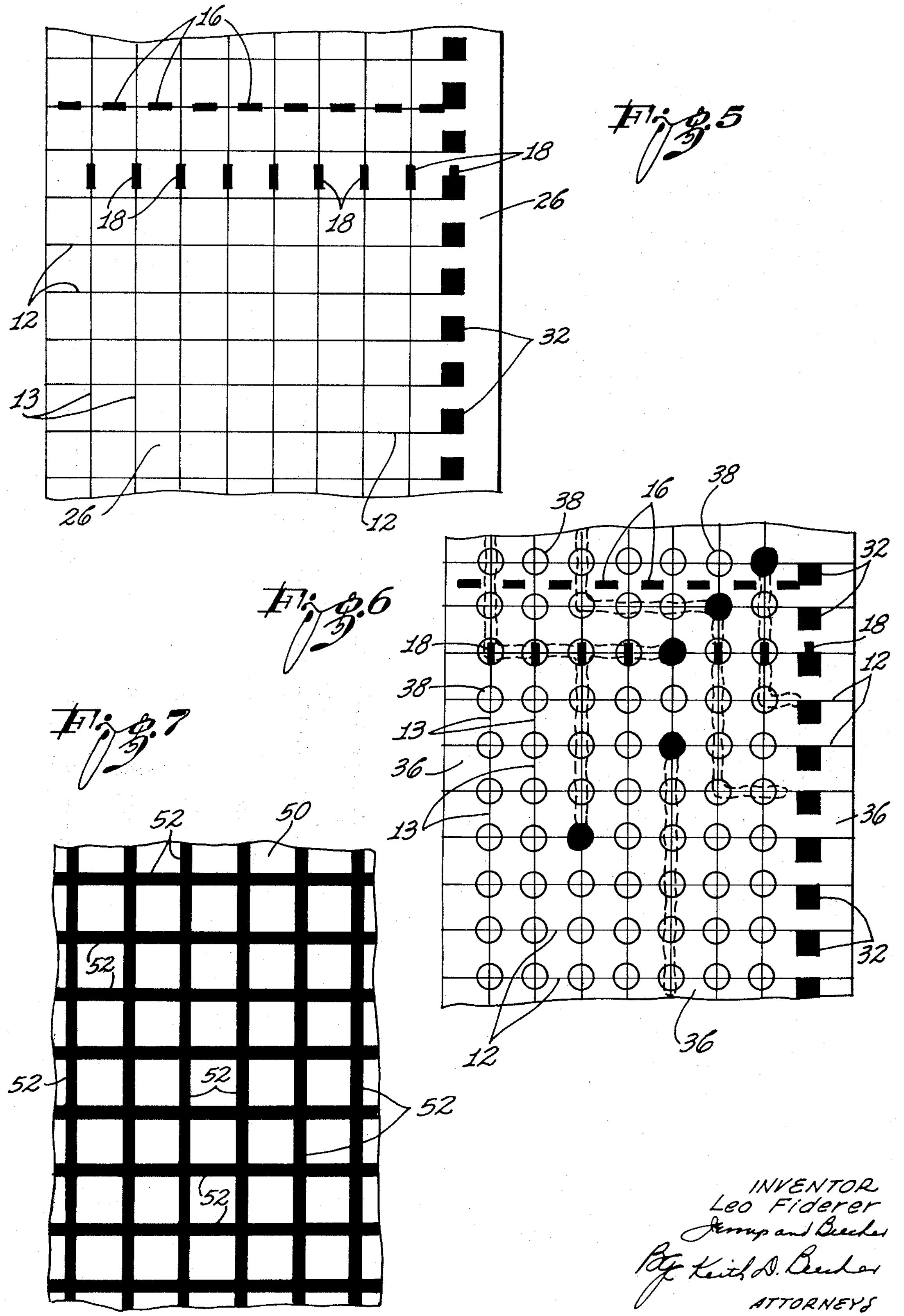
FIG. 5 is a view like FIG. 4, but in which the indexing socket holes in the stack are replaced by opaque indexing marks.
FIG. 6 is a representation of a further translucent gridded strip which may be used to digitized the pads or holes on a printed circuit pattern.
FIG. 7 is a fragmentary representation of a master grid pattern for use as a photographic master for printed circuit board fabrication, and which may be perforated under the control of the process of the invention in a manner to be described.

Likewise, with the strip of FIG. 5, the opaque indexing marks 32 are caused to pass over one of the orifices 18, so that the photocell 22 associated with that particular orifice will generate a series of clock signals for the purposes described above. Specifically, whenever a clock pulse is generated, either due to sprocket holes 30 of the tape of FIG. 4, or due to the opaque marks 32 of the tape of FIG. 5, the photocells 22 of the array are caused to examine the corresponding X-axis and Y-axis grid line segments for the presence or absence of parts of the opaque circuit line pattern 14.

In addition to digitizing the segments of the interconnecting lines of the circuit pattern 14, as described above, the process of the present invention may also be used to digitize the location of pads and holes which form a part of the printed circuit pattern 14, and which are designated, for example, as 15 in FIG. 1. The center of each hole or pad falls on the intersection of two of the grid lines 12 and 13. The digitizing procedure for such holes or pads is accomplished by means of a separate translucent sheet designated 36 in FIG. 6. The indexing marks 32 on the strip 36 are positioned with respect to the grid line 12, so that the orifices 18 are positioned at the intersections of the X-axis and Y-axis grid lines for each sensing operation at the reading station. The center of each such hole or pad falls on the intersection of the grid lines in the strip 36 of FIG. 6, in order to facilitate the marking of the hole or pad locations, small circles 38 are printed in faint lines at each grid line intersection. Then, whenever a pad or hole location is desired, the corresponding, small circle 38 is filled in and marked with a soft black pencil or a felt pen, as shown.

Then, the absence of presence of an opaque mark on each of the aforesaid circles is detected, and recorded as binary digital information in the same manner as the recording of line segments of the interconnecting lines of the circuit pattern 14, as described above. Then, the automatic printed circuit machinery is caused to form a pad or hole at each intersection of the grid lines, corresponding to the marks 15 of FIG. 1, and when the corresponding circles 38 in the strip of FIG. 6 have been filled in and rendered opaque.

As indicated above, the resulting binary data digital signals concerning the relative location of the aforesaid holes, pads, and interconnecting lines of the circuit pattern 14 of FIG. 1, and which are generated by the photocells 22 at the read station may be encoded and stored on appropriate media, such as punch cards, magnetic tap, or perforated numerical control paper tape. The stored data is then appropriate for subsequent use by a computer in the same manner in which information from a conventional digitizer is used. In addition, however, the unlike the prior art digitizer, the process described above also permits the resulting binary digital signals to be used directly in the control of a wide variety of automatic machines for the production of printed circuit boards, and the like, and without the need for a digital computer and its essential peripheral equipment.

When the binary digital information produced by the photocells 22 is used without the intervention of a digital computer, the output of each photocell is amplified to a level sufficient to switch a relay, solenoid, or other switching device. Each photocell output is connected by way of the aforesaid amplifier, to a relay or solenoid which triggers a punch, for example, in a paper tape perforating mechanism, such as are presently used in the preparation of perforated numerical control tapes. The details of construction of such a mechanism to advance and to punch numerical control paper tapes are well known to the art.

Figure 8A:
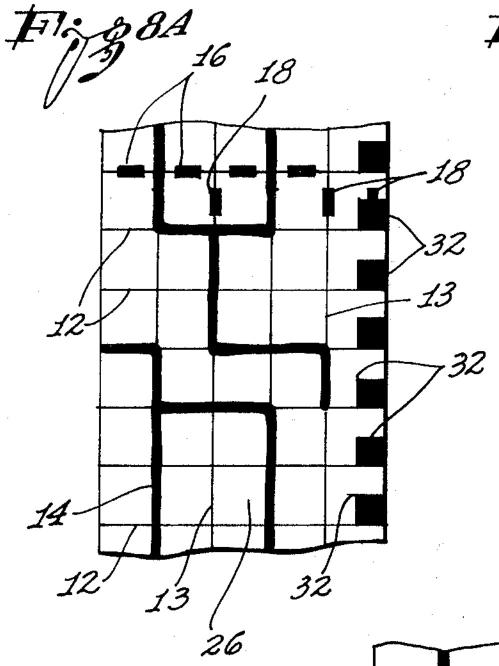
FIGS. 8A–8C show steps by which the process of the invention may be used to create the photomaster for a printed circuit from the master grid pattern shown in FIG. 7.

The stepped advance of the aforesaid sheet 10 of FIGS. 1 and 2, or strips 26 or 36 of FIGS. 4–6, past the read station synchronized with the simultaneously stepped advance of the numerical control tape past its punching station. Then, for each incremental step, the absence or presence of an opaque marking over the corresponding orifice of the series 16 or 18 is translated into the absence or presence of a corresponding punched hole in the paper tape. The aforesaid operation is illustrated, for example, in FIGS. 8A and 8B in which the circuit connections of the pattern 14 are sensed as they cover the orifices 16 and 18, and each incremental step results in a corresponding series of punches 42*a* through 42*h* in a punched paper tape 40 in FIG. 8B. In this way the numerical control tape contains punches corresponding to the presence, for example, of an opaque mark on a corresponding segment of the tape 26 in FIG. 8A, and contains an absence of a punch at a location corresponding to the absence of such a mark on the tape 26.

When completed, the numerical control tape 40 resembles a usual perforated numerical control tape such as is used, for example, as the input for a digital computer. However, there is one significant difference between the ordinary perforated control tape which is used as a computer input, and the tape 40 of FIG. 8B produced by the digitizing method of the present invention. Specifically, in the case of a usual prior art perforated control tape, the combination of holes 42*a* through 42*h* at each increment represents a special character which may, for example, be alphabetic, numeric, punctuation mark, or the like, and which must be decoded and interpreted by the computer for subsequent use in a programmed sequence. On the control tape 40 of FIG. 8B, however, the pattern of perforations 42*a* through 42*h* on the tape is an exact replica of the markings 14 on the accompanying tape 26 of FIG. 8A. The holes 42*a*, 42*c*, 42*e* and 42*g* are created as a result of signals sent from sensing orifices 18, while the holes 42*b*, 42*d*, 42*f* and 42h are created from signals sent by the photocells under sensing orifices 16. Therefore, the punched control tape 40 of FIG. 8B may serve as a template to actuate a variety of automatic machines used in the fabrication of circuit interconnections, and without requiring the services of a character-decoding computer.

Among the many possible applications of the control tape 40 of FIG. 8B, two illustrative examples will be described herein. These examples will show the manner in which the perforated control tape 40 of FIG. 8B may be used to actuate automatic machinery, and without the requirements of character-decoding computer circuitry, as is the case with the usual prior art numeric control tapes.

For example, one possible application of a perforated control tape 40 produced by the process of the present invention is in the control of a drilling machine for drilling holes in printed circuit boards. Conventional numerically controlled drilling machines require a computer to process the information from the prior art numeric control tape. This is achieved by the computer reading blocks of characters from the tape and then translating these characters into a sequence of X- and Y- movements of a positioning table to which the printed circuit board is fastened. Then, for each hole to be drilled in the prior art method, a block of several characters on the perforated tape has to be decoded and acted upon by the servo motors which control the movement of the positioning table.

The aforesaid prior art control tape for controlling drilling machinery is normally created by a prior art digitizing system, such as described above, or by a programmer who plans the sequence of drilling operations, and who then types the coded commands on a teletype keyboard connected to a tape perforating mechanism. In both cases, the information about the hole locations must first be translated by way of special circuitry into combinations of holes on the tape representing alphabetic or numeric characters. Then, when such a tape is used to actuate the drilling machine in the prior art system, the characters on the tape must be decoded by a computer and must be converted into commands for the movements of the positioning table of the drilling machine. However, when the control tape produced by the process of the present invention is used, the positioning table of the drilling machine may be moved in small steps from one standard grid position to the next by a step and repeat mechanism. Simultaneously, the control tape of the invention is scanned by a photoelectric or mechanical read station in steps corresponding to the steps of the positioning table of the drilling machine. Then, whenever the read station encounters a hole in the control tape, the sensor in the read station transmits an amplified electric signal directly to the switch controlling the drill head and causes the drill to drill a hole at the corresponding spot in the printed circuit.

Since there is a one-to-one correspondence between the pattern of holes in the control tape produced by the process of the present invention, and the pattern of holes to be drilled in the printed circuit board, it is obvious that the control circuitry required to translate the pattern of holes on the control tape into the pattern of holes in the circuit board is much less complex and much less expensive than the circuitry required by the utilization of the usual prior art perforated numeric control tapes which are designed for used with a computer.

Another possible example for the application of the perforated control tape produced by the process of the present invention is in the creation of photographic masters for printed circuit interconnection lines with the help of perforations. For example, a sample of an accurate master grid pattern 50 is shown in FIG. 7, and which is made up of a multiplicity of intersecting lines 52. This master grid pattern 50 may be economically mass produced. When used to create the pattern of interconnecting lines for a particular circuit, this master grid is inserted into a perforating mechanism similar to the one used to create a perforated numerical control tape 40 of FIG. 8B, and is advanced in steps from one X-axis grid line 52 to the next.

Figure 8B:
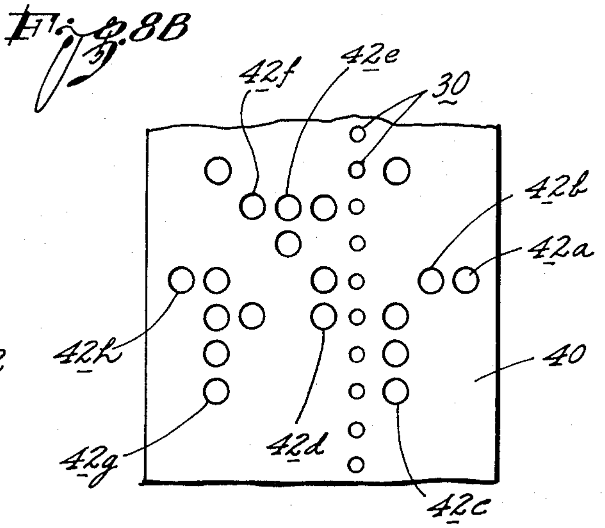
Figure 8C:
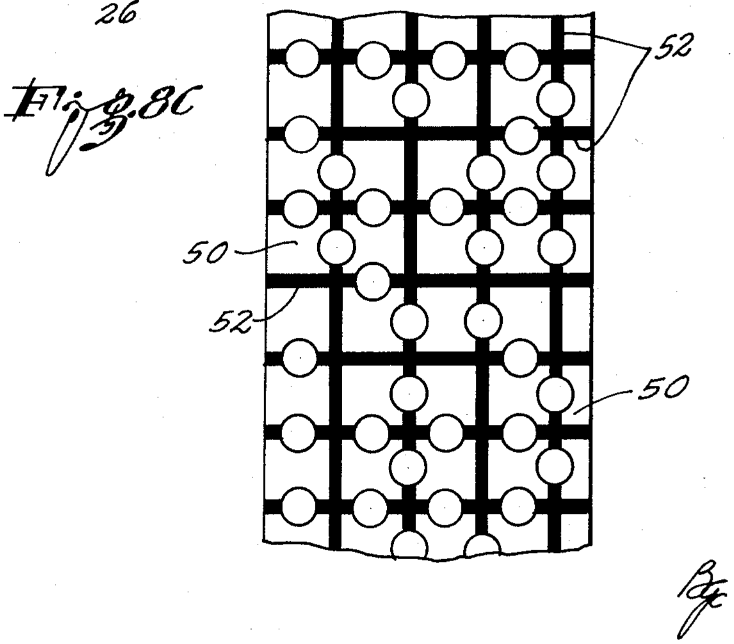

Simultaneously with the aforesaid operation, the perforated control tape 40 of FIG. 8B (which was produced by the process of the present invention) is advanced in corresponding steps past a tape reader station. At each step of the control tape 40, the absence or presence of a hole 42 in the control tape is signalled to a corresponding punch in the perforating mechanism containing the master grid pattern 50. Whenever a line segment in the grid pattern 50 is supposed to form part of the final circuit interconnection, the corresponding punch is not energized. However, whenever a line segment is not to form a part of the circuit connection, the appropriate punch is energized and serves to break the line in the corresponding portion of the master grid, as best shown in FIG. 8C. All the line segments of FIG. 8C which remain unbroken after the master grid pattern has passed the perforating station are the ones which are required to form the second interconnection pattern. This pattern can subsequently be used as a photo master for a printed circuit.

In the aforementioned examples, the amplified binary signals emanating from the photocells 22 can also be used to actuate the automatic machinery directly without first punching a perforated control tape 40. There is a one-to-one correspondence between each binary signal from a photocell 22 and a hole 42*a* through 42*h* in control tape 40, and between each hole in control tape 40 and a processing step in the aforementioned automatic machinery. The perforated control tape 40 is convenient as a permanent storage device of information for repeated use, where a repeated use of a gridded sheet or strip with pencil markings 14 or 15 might cause excessive wear and eventual obliteration of said markings 14 and 15.

The present invention provides, therefore, an improved process which is capable of digitizing printed circuit data in a simpler and more straightforward manner than the prior art efforts, and by the use of simpler and less expensive equipment. In addition, the process of the invention permits such digitizing to proceed more rapidly than by the prior art methods, and does not depend for its accuracy on the skill or dexterity of the operator. Moreover, the process of the invention is capable of providing control tapes for direct automatic machine control without the need for intervening computers or character decoding circuitry.

While particular embodiments of the process of the present invention have been shown and described, it is apparent that modifications may be made. It is intended to cover all such modifications in the following claims.

What is claimed is:

1. A process for a circuit interconnection pattern which comprises: forming a pattern on selected X-axis and Y-axis grid line segments of a transparent gridded sheet; drawing the sheet past a reading station having a first series of sensing orifices in alignment with the X-axis grid line segments, and having a second series of sensing orifices in alignment with the Y-axis grid line segments, and further having separate photocells at each of the sensing orifices, thereby sensing the X-axis and Y-axis grid line segments to produce binary output signals representative of the presence or absence of the pattern on successive ones of said segments for each incremental position of the sheet with respect to the reading station.

2. The process defined in claim 1 in which pad and hole locations for said pattern are formed by marking selected intersections of said X-axis and Y-axis grid line segments, and by sensing said intersections to produce binary output signals representative of the presence or absence of a marking thereon.

3. The process defined in claim 1, and which comprises forming said sheet into strips and sensing the X-axis and Y-axis grid line segments of successive ones of said strips to produce said binary output signals.

4. The process defined in claim 1, and which comprises passing selected widths of the aforesaid sheet in a series of successive passes past the reading station.

5. The process defined in claim 1, and which includes moving said sheet incrementally from one of said X-axis and Y-axis line segments to the next past the reading station during said sensing step.

6. The process defined in claim 1 and which includes providing indexing perforations in said sheet.

7. The process defined in claim 1 and which comprises providing opaque indexing markings on said sheet, and of sensing said markings.

8. The process defined in claim 1 in which the aforesaid pattern represents interconnecting circuit conductors.

9. The process defined in claim 1 in which the aforesaid pattern represents the location of pads and holes at the intersections of selected ones of the aforesaid X-axis and Y-axis grid lines.

10. The process defined in claim 1 in which the a perforated control tape is created which represents a replica of the pattern of circuit elements, either line segments, pads, or holes.

* * * * *